United States Patent [19]

Ueda

[11] Patent Number: 4,900,645
[45] Date of Patent: Feb. 13, 1990

[54] ELECTROPHOTOGRAPHIC PHOTOSENSITIVE MEMBER COMPRISES STYRYL COMPOUND AS TRANSPORT MATERIAL

[75] Inventor: Hideaki Ueda, Osaka, Japan

[73] Assignee: Minolta Camera Kabushiki Kaisha, Osaka, Japan

[21] Appl. No.: 185,871

[22] Filed: Apr. 25, 1988

[30] Foreign Application Priority Data

| Apr. 27, 1987 | [JP] | Japan | 62-105427 |
| Apr. 27, 1987 | [JP] | Japan | 62-105428 |
| Apr. 27, 1987 | [JP] | Japan | 62-105433 |

[51] Int. Cl.$^4$ .................................................. G03G 5/14
[52] U.S. Cl. .................................... 430/58; 430/71; 430/70
[58] Field of Search .......................... 430/58, 59, 70, 71

[56] References Cited

U.S. PATENT DOCUMENTS

| 3,331,687 | 7/1967 | Kosche | 430/70 |
| 3,873,311 | 3/1975 | Contois et al. | 430/58 |
| 3,873,312 | 3/1975 | Contois et al. | 430/58 |
| 3,992,203 | 11/1976 | Horhold et al. | 430/72 |
| 4,195,990 | 4/1980 | Staudenmayer et al. | 430/70 |
| 4,362,798 | 12/1982 | Anderson et al. | 430/59 |
| 4,515,883 | 5/1985 | Sasaki | 430/58 |
| 4,606,988 | 8/1986 | Sasaki | 430/59 |
| 4,619,879 | 10/1986 | Kakuta et al. | 430/58 |
| 4,622,278 | 11/1986 | Kondo et al. | 430/59 |
| 4,622,280 | 11/1986 | Makino et al. | 430/70 |
| 4,642,280 | 2/1987 | Ueda | 430/58 |

FOREIGN PATENT DOCUMENTS

| 56-50333 | 5/1981 | Japan . |
| 58-65441 | 4/1983 | Japan . |
| 60-232553 | 11/1985 | Japan . |
| 61-32062 | 2/1986 | Japan . |

*Primary Examiner*—J. David Welsh
*Attorney, Agent, or Firm*—Burns, Doane, Swecker & Mathis

[57] ABSTRACT

The present invention relates to a photosensitive member containing a specific styryl compound for a charge transporting material, which is improved in photographic propertied such as photosensitivity and repeating properties.

10 Claims, 1 Drawing Sheet

ELECTROPHOTOGRAPHIC PHOTOSENSITIVE MEMBER COMPRISES STYRYL COMPOUND AS TRANSPORT MATERIAL

BACKGROUND OF THE INVENTION

The present invention relates to photosensitive member for electrophotography, and more particularly to an electrophotographic photosensitive member having a photosensitive layer which comprises a styryl compound as a main component.

Widely known as photosensitive members for electrophotography are those of function-divided types comprising a charge generating layer and a charge transporting layer which are formed on an electrically conductive substrate, and those of dispersion types comprising a photoconductive layer formed on a substrate and prepared by dispersing photoconductive particles in resin.

With the function-divided type, separated layers work dividedly to serve the basic functions of the photosensitive member, i.e generation of charge carriers and transport of the charges, to provide a photosensitive layer chargeable to a high surface potential and exhibiting great charge retentivity, high photosensitivity and stabilized repetition characteristics. Many compounds are known as charge generating materials and as charge transporting materials for use in the photosensitive members of the function-divided type. For example, a various organic photoconductors of low molecular weight have been proposed for use in charge transporting layers. More specifically, U.S. Pat. No. 3,189,447 proposes use of 2,5-bis (p-diethylaminophenyl)-1,3,4-oxadiazole, but this compound has only a poor compatibility with binders and is liable to separate out as crystals. Further U.S Pat. No 3,820,989 discloses use of diarylalkane derivatives having a high compatibility with binders. However, the photosensitive member containing the derivatives undergose variations in sensitivity when repeatedly used, and is still required to be improved in initial sensitivity and residual potential characteristics, as well as in sensitivity variations and durability for repeated use.

SUMMARY OF THE INVENTION

The main objects of the present invention are to improve the foregoing drawbacks of the prior arts and to provide an electrophotographic phtosensitive member having a high photosensitivity and stable electrophotographic characteristics even at repeated use.

Stated more specially, the present invention provides and electrophotographic photosensitive member comprising a styryl compound represented by the following formula (I);

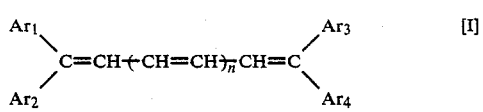

wherein $Ar_1$ is halogen atom or a cyano group; or a condensed polycyclic group, an aromatic heterocyclic group, an alkyl group or an aralkyl group, each of which may have substituents; $Ar_2$ is an aromatic hydrocarbon group, a condensed polycyclic group or an aromatic heterocyclic group, each of which may have substituents; $Ar_3$ and $Ar_4$ are independently an aromatic hydrocarbon group, a condensed polycyclic group or a heterocyclic group, each of which may have substituents; n is 0 or 1; One of $Ar_1$, $Ar_2$, $Ar_3$ and $Ar_4$ is an aromatic hydrocarbon group which may have substituents.

DETAILED DESCRIPTION OF THE INVENTION

Figure 1:
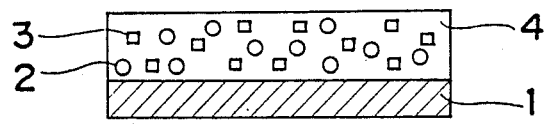
FIG. 1 is a diagram showing the structure of a dispersion-type photosensitive member embodying the invention comprising a photosensitive layer formed on an electrically conductive substrate.

The present invention relates to a photosensitive member comprising a styryl compound represented by the following general formula (I);

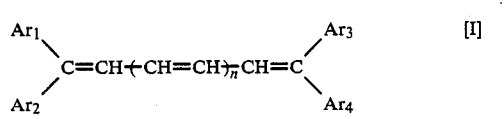

wherein $Ar_1$ is halogen atom or a cyano group; or a condensed polycyclic group, an aromatic heterocyclic group, an alkyl group or an aralkyl group, each of which may have substituents; $Ar_2$ is an aromatic hydrocarbon group, a condensed polycyclic group or an aromatic heterocyclic group, each of which may have substituents; $Ar_3$ and $Ar_4$ are independently an aromatic hydrocarbon group, a condensed polycyclic group or a heterocyclic group, each of which may have substituents; n is 0 or 1; One of $Ar_1$, $Ar_2$, $Ar_3$ and $Ar_4$ is an aromatic hydrocarbon group which may have substituents.

A styryl compound may be used as a photoconductive material for a photosensitive member or incorporated in a charge transporting layer of function divided photosensitive member to make only use of charge transporting ability of the stylyl compound.

The use of the present compound inhibits the light fatigue of the photosensitive member effectively and renders the member repeatedly usable with a diminished surface potential reduction, reduced rise of residual potential and lesser sensitivity variation, enabling the member to exhibit stable electrophotographic characteristics and high sesitivity to afford sharp copy images. The present compound also effects coatability.

Examples of preferred styryl compounds of the present invention represented by the formula (I) are those having the following structual formula. These examples are in no way limitative.
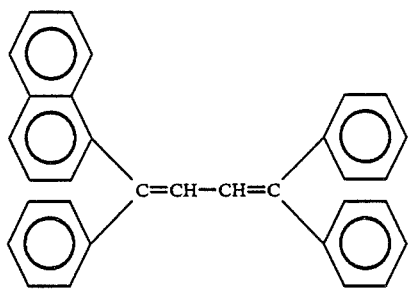
[1]
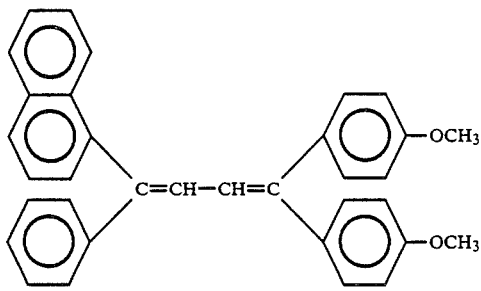
[2]
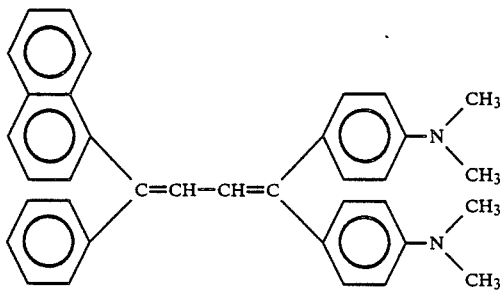
[3]
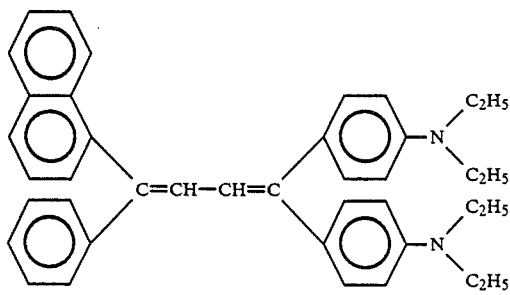
[4]
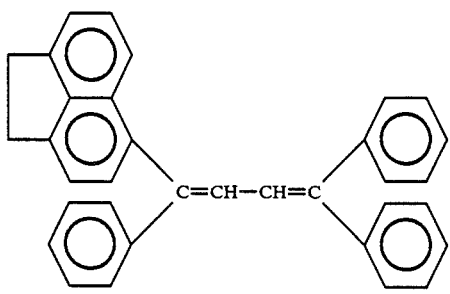
[5]

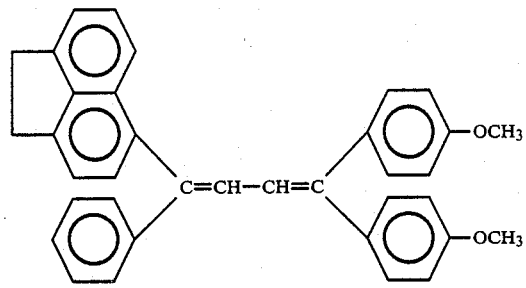
[6]
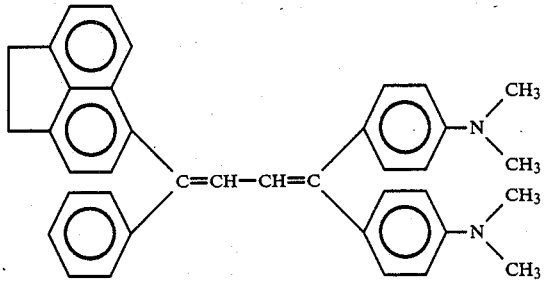
[7]
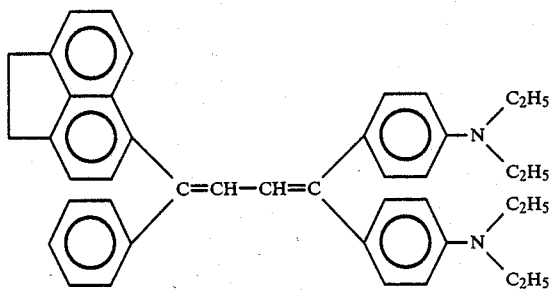
[8]
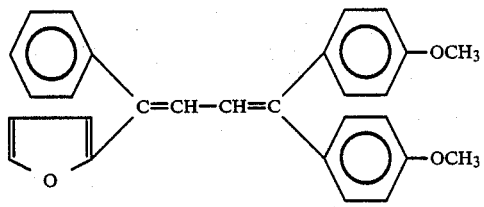
[9]
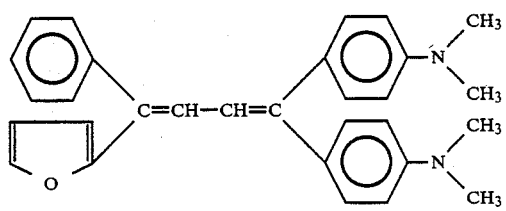
[10]
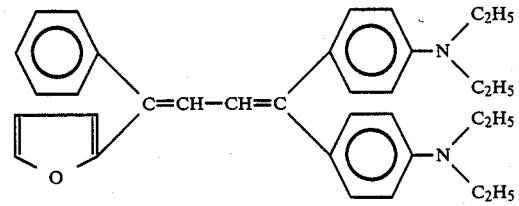
[11]

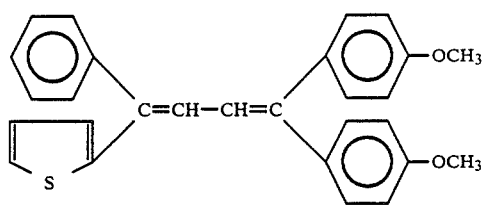 [12]
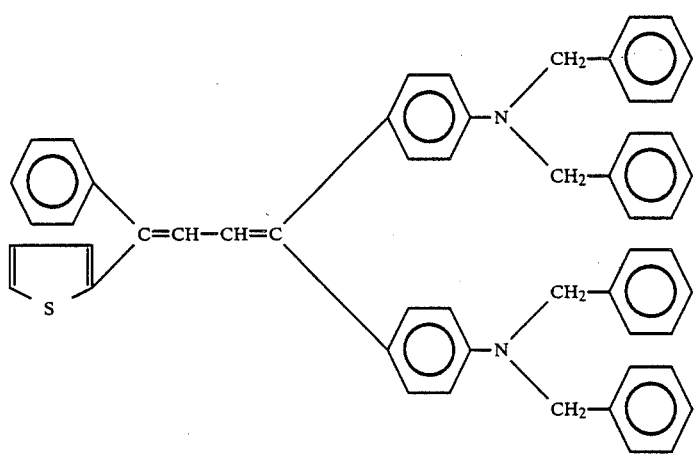 [13]
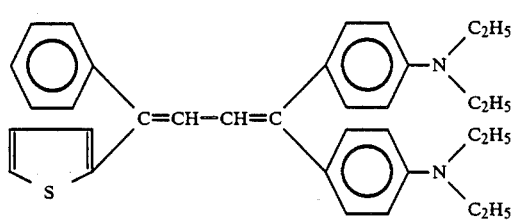 [14]
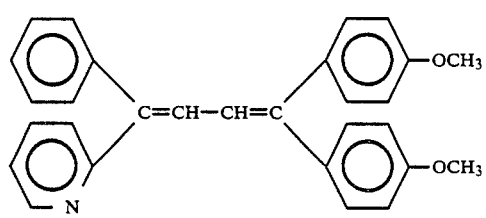 [15]
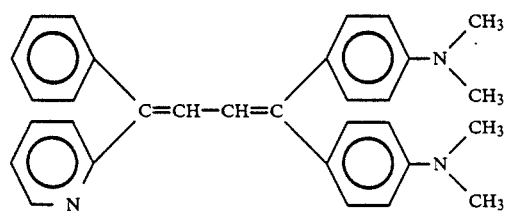 [16]
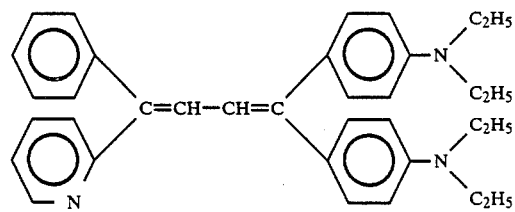 [17]

-continued
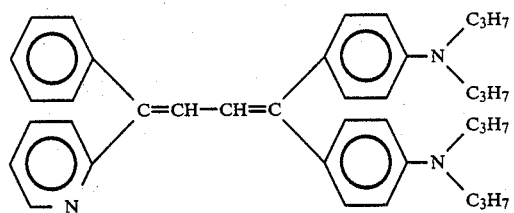
[18]
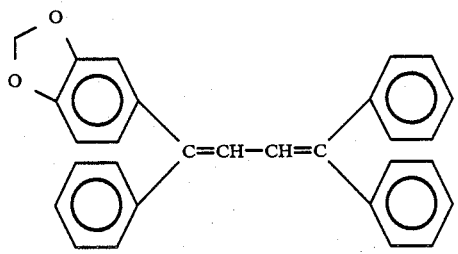
[19]
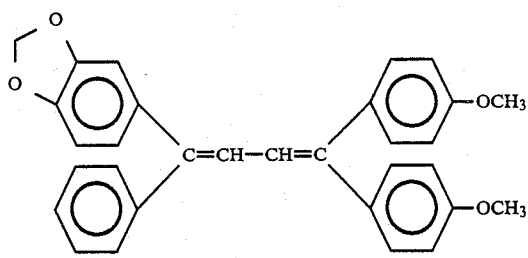
[20]
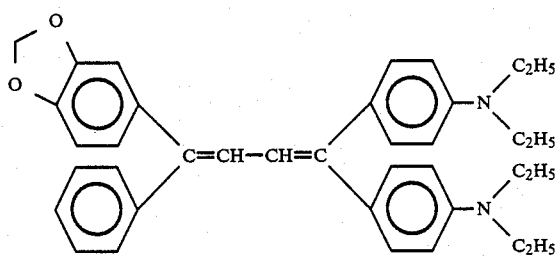
[21]
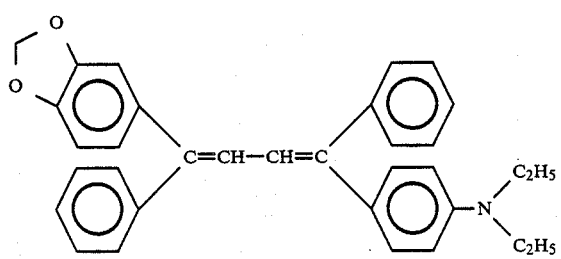
[22]
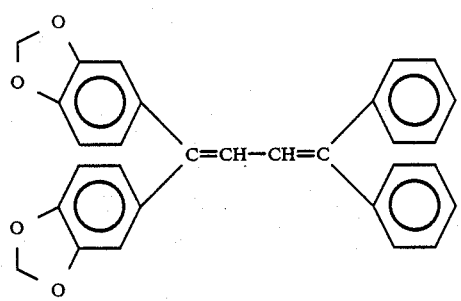
[23]

-continued
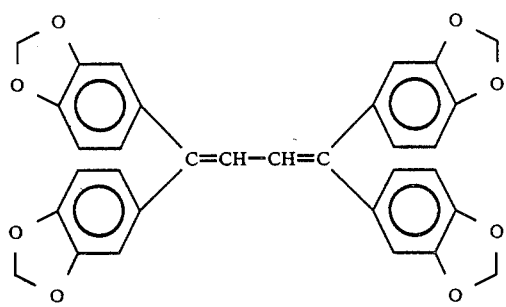  [24]
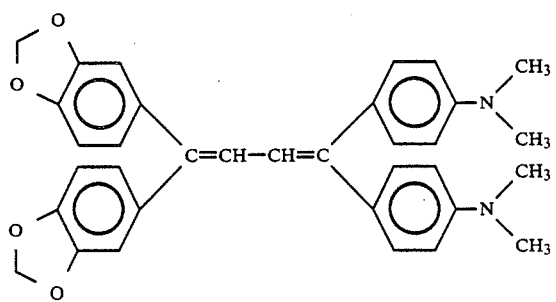  [25]
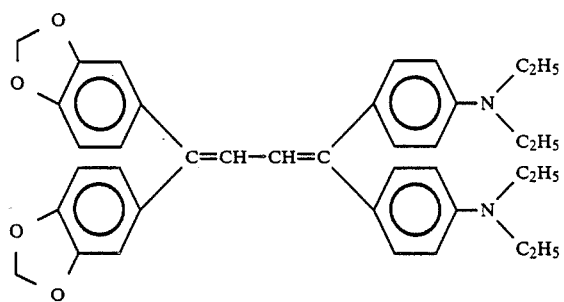  [26]
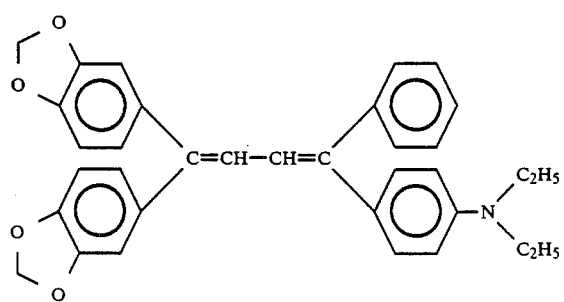  [27]
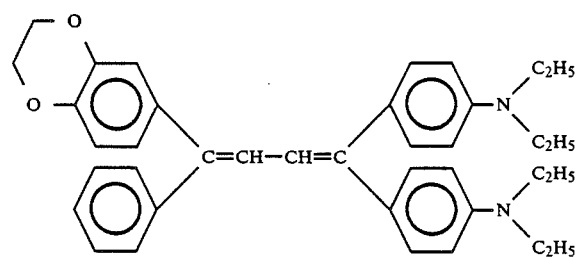  [28]

-continued

[29]
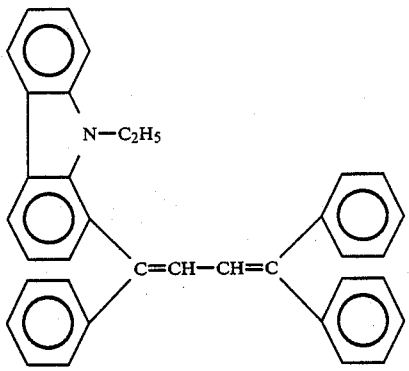

[30]
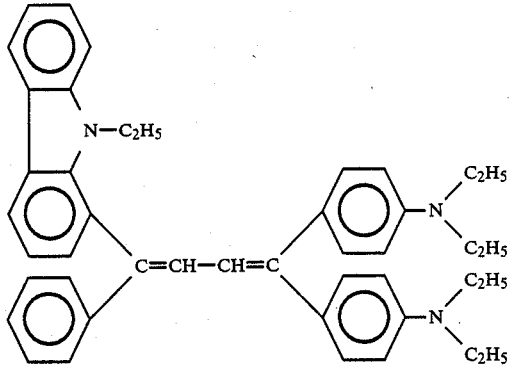

The styryl compound represented by the formula (I) is prepared, for example, by condensing a phosphorus compound represented by the formula(II):

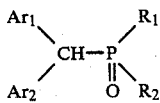 [II]

wherein $Ar_1$ and $Ar_2$ are as defined in the formula (I), and $R_1$ and $R_2$ are each alkyl, cycloalkyl, aralkyl or aryl which forms a phosphonium salt, with an acrolein compound represented by the formula (III)

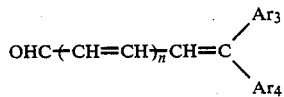 [III]

wherein $Ar_3$, $Ar_4$ and n is 0 or 1 are defined in the formula (I). Preferably, each of $R_1$ and $R_2$ in the formula (II) representing the phosphorus compound is cyclohexyl, benzyl, phenyl, or lower alkyl.

Examples of reaction solvents useful for the foregoing process are hydrocarbons, alcohols and ethers, such as methanol, ethanol, isopropanol, butanol, 2-methoxyethanol, 1,2-dimethoxyethane, bis(2-methoxyethyl)ether, dioxane, tetrahydrofuran, toluene, xylene, dimethylsulfoxide, N,N-dimethylformamide, N-methylpyrrolidone, 1,3-dimethyl-2-imidazolizinone, etc. Among these solvents, polar solvents such as N,N-dimethylformamide and dimethyl sulfoxide are especially preferable.

Examples of useful condensing agents are sodium hydroxide, potassium hydoroxide, sodium amide, sodium hydride, and alcoholates such as sodium methylate, potassium-t-butoxide, etc.

The reaction temperature can be selected from a wide range of from about 0° C. to about 100° C. and is preferably 10° C. to 80° C.

Alternatively, the styryl compound to be used in the invention can be prepared from a corresponding quaternary phosphonium salt, such as triphenylphosphonium salt, in place of the phosphorus compound of the formula (II), via phosphorylene obtained by the witting process and by the condensation of this compound with an aldehyde compound of the formula (III). The styryl compounds exemplified above may be used singly or in admixture.

FIG. 1 to 5 schematically show examples of electrophotographic photosensitive members prepared with use of the styryl compound of the invention.

FIG. 1 shows a photosensitive member comprising a photosensitive layer 4 formed on a substrate 1 and prepared from a photoconductive material 3 and a charge transporting material 2 as admixed with a binder. The styryl compound of the invention is used as the charge transporting material.

Figure 2:
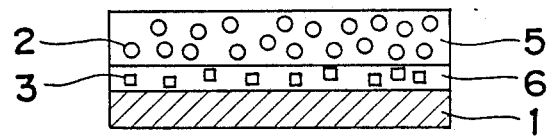
FIG. 2 is a diagram showing the structure of a photosensitive member of the function-divided type comprising a charge generating layer and a charge transporting layer which are formed on an electrically conductive substrate.

FIG. 2 shows a photosensitive member of the function-divided type comprising a charge generating layer 6 and a charge transporting layer 5 which are combined to serve as a photosensitive layer. The charge transporting layer 5 is formed over the surface of the charge generating layer 6. The styryl compound of the invention is incorporated in the charge transporting layer 5.

Figure 3:
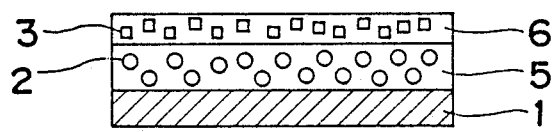
FIG. 3 is a diagram showing the structure of another phtosensitive member of the function-divided type comprising a charge generating layer and a charge transporting layer which are formed on an electrically conductive substrate.

FIG. 3 shows another photosensiteve member of the function-divided type which, like the one shown in FIG. 2, comprises a charge generating layer 6 and a charge transporting layer 5. In converse relation to the member shown in FIG. 2, the charge generating layer 6 is formed over the surface of the charge transporting layer 5.

Figure 4:
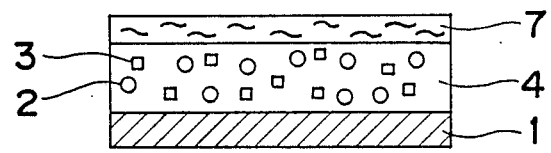
FIG. 4 is a diagram showing the structure of another diseersion-type photosensitive member comprising a photosensitive layer and a surface protective layer formed on an electrically conductive substrate.

The member shown in FIG. 4 comprises the one shown in FIG. 1 and a surface protective layer 7 formed over the surface of the photosensitive layer 4. The photosensitive layer 4 may be separated into a charge generating layer 6 and a charge transporting layer 5 to provide a photosensitive member of the function-divided type.

Figure 5:
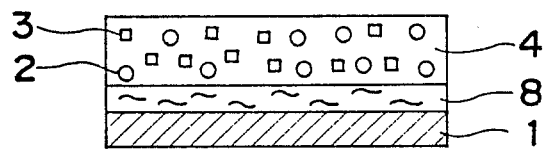
FIG. 5 is a diagram showing the structure of another dispersion-type photosensitive member comprising a photosensitive layer and an intermediate layer formed on an electrically conductive substrate.

FIG. 5 shows a photosensitive member having the same construction as the on shown in FIG. 1 except that an intermediate layer 8 is interposed between the substrate 1 and the photosensitive layer 4. The intermediate layer 8 serves to give enhanced adhesion, afford improved coatability, protect the substrate and assure injection of charges from the substrate into the photoconductive layer with improved effectiveness. Polyimide resin, polyester resin, polyvinyl butyral resin, casein, etc. are useful for forming the intermediate layer. The photosensitive layer of the member may also be modified to the function divided type.

A photosensitive member of the present invention for use in electrophotography can be prepared by dissolving or dispersing the styryl compound of the formula (I) and a binder in a suitable solvent to obtain a coating composition, applying the composition to an electrically conductive substrate and drying the coating. When required, a photoconductive material and an electron-attracting compound, or a sensitizing dye and other pigments can be admixed with the coating composition. The dried coating, i.e. photosensitive layer, is usually 5 to 30 μm, preferably 6 to 20 μm, in thickness.

More specifically, the phtosensitive member of the function-divided type having the same structure as the member of FIG. 2 discribed, i.e. having a charge generating layer formed on an electrically conductive substrate and a charge transporting layer on the layer, can be prepared by coating the substrate with a charge generating material by vacuum deposition or by coating the substrate with a composition obtained by dispersing the material in a suitable solvent which may contain a binder resin dissolved therein when so required and drying the coating, to form charge generating layer, and further coating this layer with a solution of the styryl compound serving as a charge transporting material and binder resin in a suitable solvent, to form a charge transporting layer.

Phthalocyanines such as metal free phthalocyanine,- titanyl phthalocyanine, aluminium chlorophthalocyanine may be put to use for vacuum deposition. Bisazo pigments may be put to use for dispersion type.

The charge generating layer thus formed is 4 μm or less, preferably 2 μm or less, in thickness, while the charge transporting layer is 3 to 30 μm, preferably 5 to 20 μm, in thickness. It is suitable that the charge transporting layer contains the styryl compound in an amount of 0.02 to 2 parts by weight, more suitably 0.03 to 1.3 parts by weight, per part by weight of the binder resin. The styryl compound may be used in combination with some other charge transporting material. When this material is a high-molecular-weight charge transporting material which itself is serviceable as a binder, the other binder can be dispensed with. The photosensitive member, like the one shown in FIG. 3, may be so constructed that the charge transporting layer is provided on the electrtically conductive substrate, with the charge generating layer formed on the transporting layer.

The photosensitive member of the dispersion type having the same structure as the member of FIG. 1 described, i.e. having a photoconductive layer on an electrically conductive substrate, is prepared by dispersing a finely divided photoconductive material in a solution of the styryl compound and a binder resin, coating the conductive substrate with the dispersion and drying the coating to form a photoconductive layer. The photoconductive layer thus formed is 3 to 30 μm, preferably 5 to 20 μm, in thickness. If the photoconductive material is used in too small an amount, lower sensitivity will result, whereas presence of an excess of the material leads to impaired chargeability or gives reduced strength to the photoconductive layer. It is desirable that the photoconductive layer contains the phtoconductive material in an amount of 0.01 to 2 parts by weight, more desirably 0.05 to 1 part by weight, per part by weight of the binder resin. The amount of styryl compound is preferably 0.01 to 2 parts by weight, more preferably 0.02 to 1.2 parts by weight, per part by weight of the binder resin. The styryl compound may be used conjointly with a high-molecular weight photoconductive material, such as polyvinylcarbazole, which is serviceable as a binder in itself, or with some other charge transporting material such as hydrazone.

Examples of charge generating materials useful for the present photosensitive member of the function-divided type and examples of photoconductive materials useful for the dispersion-type member are organic substances such as bisazo pigments, triarylmethane dyes, thiazine dyes, oxazine dyes, xanthene dyes, cyanine coloring agents, styryl coloring agents, pyrylium dyes, azo pigments, quinacridone pigments, indigo pigments, perylene pigments, polycyclic quinone pigments, bisbenzimidazole pigments, indanthrone pigments, squalylium pigments and phthalocyanine pigments; and inorganic substances such as selenium, selenium-tellurium, selenium arsenic, cadmium sulfide and amorphous silicon. Any other material is also usable insofar as it generates charge carriers very efficiently upon absorption of light.

The binder to be used is any of known thermoplastic resins or thermosetting resins having electrically insulating properties, photocrosslinking resins and photoconductive resins. Although not limitative, examples of suitable binders are thermoplastic binders such as saturated polyester resin, polyamide resin, acrylic resin, ethylene-vinyl acetate copolymer, ion-crosslinked olefin copolymer (ionomer), styrene-butadiene block copolymer, polyallylate, polycarbonate, vinyl chloride-vinyl acetate copolymer, cellulose ester, polyimide and styrol resin; thermosetting binders such as epoxy resin, urethane resin, silicone resin, phenolic resin, melamine resin, xylene resin, alkyd resin and thermosetting acrylic resin; photocrosslinking resins; photoconductive resins such as poly-N-vinylcarbazole, polyvinylpyrene and polyvinylanthracene; etc. These binders are usable singly or in admixture. The electrically insulating resin is preferably at least $1 \times 10^{12}$ ohm-cm in volume resistivity. More preferable among the foregoing examples are polyester resin, polycarbonate and acrylic resin.

In preparing electrophotographic photosensitive members according to the present invention, the binder may be used conjointly with plasticizers such as paraffin halide, polybiphenyl chloride, dimethylnaphthalene, dibutyl phthalate and o-terphenyl; electronattracting sensitizers such as chloranil, tetracyanoethylene, 2,4,7-trinitro-9-fluorenone, 5,6-dicyanobenzoquinone, tetracyanoquinodimethane, tetrachlorophthalic anhydride and 3,5-dinitrobenzoic acid; and sensitizers such as Methyl Violet, Rhodamine B, cyanine dye, pyrylium salt and thiapyrylium salt.

A photosensitive member thus prepared for use in electrophotography may have an adhesion or intermediate layer, or a surface protective layer when so required as already stated with reference to FIG. 4 or 5.

Suitable examples contained in the intermediate layer are polymers itself such as polyimide, polyamide, nitrocellulose, polyvinyl butyral, polyvinyl alcohol; dispersed layer with materials of low electrical resistance such as tin oxide, indium oxide and so on; vapor deposited layer such as aluminium oxide, zinc oxide, silicon dioxide and so on. Preferable thickness of the intermediate layer is 1 μm or less.

Suitable materials for a surface protective layer are acrylic resin, polyallylate resin, polycarbonate resin, urethane resin etc.; dispersed layer with materials of low electrical resistance such as tin oxide and indium oxide etc.; an organic plasma-polymerization layer; may be used. The organic plasma-polymerization layer may contain oxgen atom, nitrogen atom, halogen atoms, atoms of Group III and Group V in the periodic table, if necessary.

Preferable thickness of the surface protective layer is 5 μm or less.

As described above, the styryl compound of the present invention is easy to be prepared, can be incorporated into photosensitive members of the function-divided type or dispersion type and is usable in combination with various charge generating materials and binder resins, or conjointly with other charge transporting materials in some cases. Accordingly, the electrophotographic photosensitive member having the present styryl compound incorporated therein is very easy to be produced, finds wide use, has outstanding repetition characteristics with light fatigue effectively prevented by the styryl compound, exhibits improved sensitivity and is diminished in surface potential variation.

Preparation Example (Styryl Compound (17))

Phosphonate of 3.20 g represented by the formula;

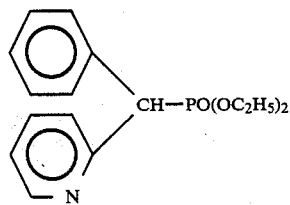

and 3.6 g of tetraethyldiamino-diphenyl-acrolein having the formula;

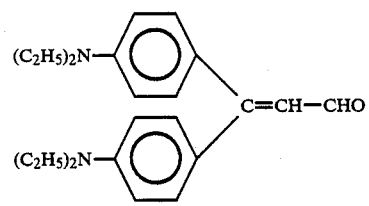

were dissolved in 30 ml of dimethylformamide. The suspension solution containing 5 g of potassium-t-butoxide in 70 ml of dimethylfomamide was dropped into the above solution at the temperature of 30°-40° C. And then, the mixed solution was stirred at the room temperature for 8 hours and allowed to stand overnight. The resulting mixed solution was put into 900 ml of ice-water to be neutralized by dilute hydrochloric acid. After about 30 minutes, separated crystals were filtered.

The filtered products were washed with water and purified by recrystallization from acetonitrile, affording 3.9 g of yellow needle crystals (yield, 98%). The result of elementary analysis was shown below;

|  | C(%) | H(%) | N(%) |
|---|---|---|---|
| Calcd | 83.83 | 7.78 | 8.38 |
| Found | 84.01 | 7.55 | 8.35 |

Preparation Example (Styryl Compound (33))

Phosphonate of 2.42 g represented by the formula;

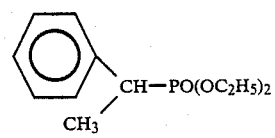

and 3.6 g of tetraethyldiamino-diphenyl-acrolein having the formula;

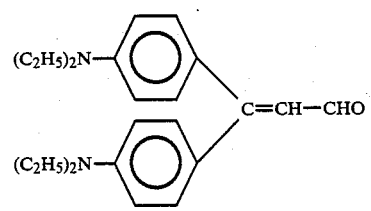

were dissolved in 30 ml of demethylformamide. The suspension solution containing 5 g of potassium-t-butoxide in 70 ml of dimethylfomamide was dropped into the above solution at the temperature of 30°-40° C. And then, the mixed solution was stirred at the room temperature for 8 hours and allowed to stand overnight. The resulting mixed solution was put into 900 ml of ice-water to be neutralized by dilute hydrochloric acid. After about 30 minutes, separated crystals were filtered.

The filtered products were washed with water and purified by recrystallization from acetonitrile, affording 3.8 g of yellow needle crystals (yield, 87%). The result of elementary analysis was shown below;

|  | C(%) | H(%) | N(%) |
|---|---|---|---|
| Calcd | 84.93 | 8.68 | 6.39 |
| Found | 84.82 | 8.70 | 6.40 |

Preparation Example (Styryl Compound (63))

Phosphonate of 2.53 g represented by the formula;

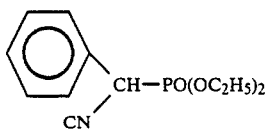

and 3.6 g of tetraethyldiamino-diphenyl-acrolein having the formula;

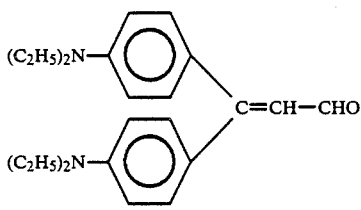

were dissolved in 30 ml of dimethylformamide. The suspension solution containing 5 g of potassium-t-butoxido in 70 ml of dimethylfomamide was dropped into the above solution at the temperature of 30°–40° C. And then, the mixed solution was stirred at the room temperature for 8 hours and allowed to stand overnight. The resulting mixed solution was put into 900 ml of ice-water to be neutralized by dilute hydrochloric acid. After about 30 minutes, separated crystals were filtered.

The filtered products were washed with water and purified by recrystallization from acetonitrile, affording 3.7 g of yellow needle crystals (yield, 82%). the result of elementary analysisi was shown below;

|  | C(%) | H(%) | N(%) |
|---|---|---|---|
| Calcd | 82.85 | 7.80 | 9.35 |
| Found | 82.70 | 7.83 | 9.29 |

EXAMPLE 1

The bisazo compound of 0.45 part by weight represented by the formula(A)

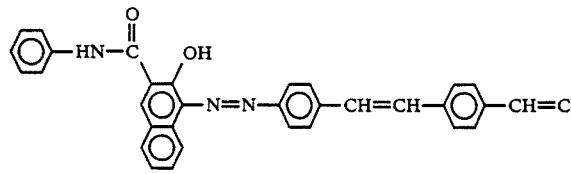

0.45 part by weight of polyester resin (Vylon 200 made by TOYOBO) and 50 parts by weight of cyclohexanone were taken in Sand grinder for dispersion. The dispersion solution of the bisazo compound was dispersed onto aluminotype-Mylar of 100 μm in thickness by a film applicator to form a charge generating layer so that a thickness of the layer after dried can be 0.3 g/m². A solution of 70 parts by weight of the styryl compound (3) and 70 parts by weight of polycabonate resin (K-1300; made by TEIJIN KASEI)dissolved in 400 parts by weight of 1,4-dioxane was dispersed onto the above formed charge generating layer to form a charge transporting layer so that the thickness of the layer after dried can be 16 μm. Thus, a photosensitive member with the two layers was prepared.

The photosensitive member thus prepared was incorporated into a commercial electrophotographic copying machine (EP-470z, made by MINOLTA CAMERA CO., LTD.) and tested with application of a voltage of −6kv to the d.c. power supply to measure the initial surface potential Vo [(v), the amount of exposure required for Vo to reduce to half of $V_o$ ($E_{1/2}$ (lux. sec)), and the potential decay rate $DDR_1(\%)$ when the member was allowed to stand in the dark for 1 second after charged.

EXAMPLES 2–4

Photosensitive members were prepared with the same structure and in a similar way as Example 1 except hat the styryl compound (4), (8), (11) for the charge transporting layer were used respectively instead of the styryl compound (3). The photosensitive members thus obtained were tested in the same manner in Example 1 to measure Vo, $E_{1/2}$ and $DDR_1$.

EXAMPLE 5

The bisazo compound of 0.45 part by weight represented by the formula (B);

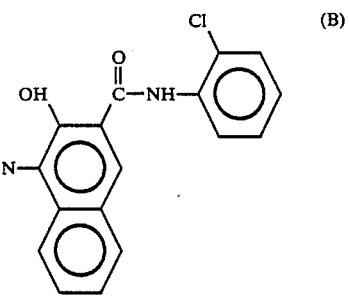

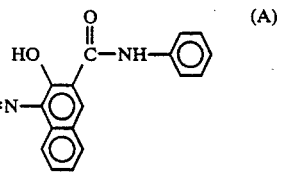

0.45 part by weight of polystyrene resin (molecular weight of 40000) and 50 parts by weight of cyclohexanone were taken in Sand grinder for dispersion. The dispersion solution of the bisazo compound was dispersed onto aluminotype-Mylar of 100 μm in thickness by a film applicator to form a charge generating layer so that a thickness of the layer after dried can be 0.3 g/m². A solution of 70 parts by weight of the styryl compound (4) and 70 parts by weight of polyallylate resin (U-100; made by YUNICHIKA co., Ltd.) dissolved in 400 parts by weight of 1,4-dioxane was dispersed onto the above formed charge generating layer to form a charge transporting layer so that the thickness of the layer after dried can be 16 μm. Thus, a photosensitive member with the two layers was prepared.

EXAMPLES 6-8

Photosensitive members were prepared with the same structure and in a similar way as Example 5 except that the styryl compound (11), (14), (17) for the charge transporting layer were used respectively instead of the styryl compound (4). The photosensitive members thus obtained were tested in the same menner in Example 1 to measure Vo, $E_{1/2}$ and $DDR_1$.

EXAMPLE 9

Copper phthalocyanine (50 parts by weight) and 0.2 part by weight of tetranitro copper phthlocyanine were dissolved in 500 parts by weight of 99% concentrated sulfuric acid with full stirring. The solution was placed into 5000 parts by weight of water to cause a photoconductive composition of copper phthalocyanine and tetranitro copper phthalocyanine to separate out, followed by filtration, washing with water and drying in a vacuum at 120° C.

The resulting composition (10 parts by weight), 22.5 parts by weight of thermosetting acrylic resin (Acrydic A 405, made by Dainippon Ink & Chemicals Inc.), 7.5 parts by weight of melamine resin (Super Beckamine J820, made by Dainippon Ink & Chemicals Inc.) and 15 parts by weight of styryl compound (21) were placed into a ball mill pot along with 100 parts by weight of a solvent mixture of methyl ethyl ketone and xylene in equal amounts. These ingredients were treated for 48 hours for dispersion to obtain a photoconductive coating composition, which was then applied to an aluminum substrate and dried to obtain a coating, about 15 μm in thickness, whereby a photosensitive member was prepared.

The Vo, $E_{1/2}$ and $DDR_1$ values of the photosensitive members thus obtained were measured in the same manner as in Example 1 except that the voltage applied to the d.c. power supply was +6 kv.

EXAMPLES 10-12

Photosensitive members were prepared with the same structure and in a similar way as Example 9 except that the styryl compound (22), (26) and (27) for the charge transporting layer were used respectively instead of the styryl compound (21).

Vo, $E_{1/2}$ and $DDR_1$ were measured in the same manner as in Example 9.

COMPARATIVE EXAMPLES 1-4

Photosensitive members were prepared with the same structure and in a similar way as the member of Example 9 except that the compounds of the formula (C), (D), (E) and (F) given below were respectvely used for the charge transporting layer in place of the styryl compound (21).

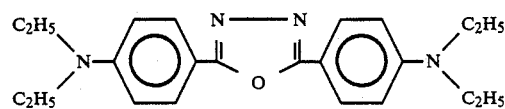

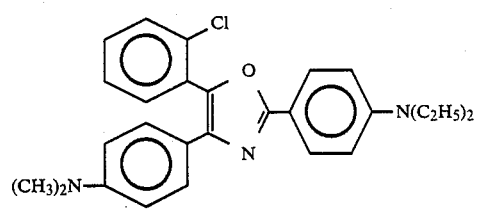

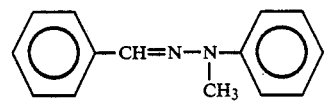

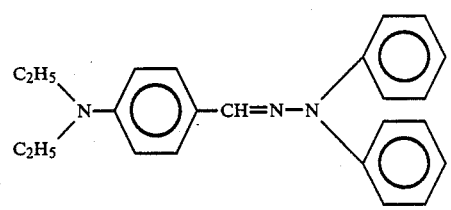

The photosensitive members thus obtained where tested in the same manner as in Example 9 to measure $V_o$, $E_{1/2}$ and $DDR_1$.

COMPARATIVE EXAMPLES 5-7

Photosensitive members were prepared with the same structure and in a similar way as Example 9 except that the styryl compound (G), (H) and (1) for the charge transporting layer were used respectively instead of the styryl compound (21).

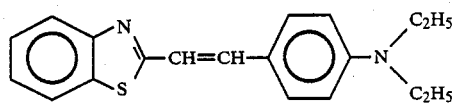

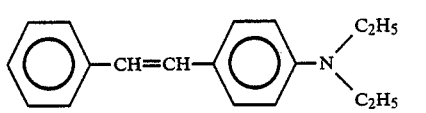

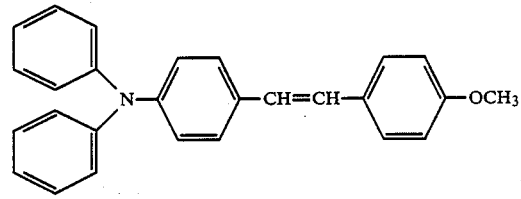

The Vo, $E_{1/2}$ and $DDR_1$ of the photosensitive members thus prepared were measured in the same manner as in Example 9: Table 1 shows the results.

TABLE 1

|  | Vo (V) | $E_{\frac{1}{2}}$ (lux · sec) | $DDR_1$ (%) |
|---|---|---|---|
| example 1 | −640 | 2.7 | 3.2 |
| example 2 | −640 | 2.4 | 3.0 |
| example 3 | −650 | 2.5 | 2.4 |
| example 4 | −630 | 2.6 | 3.7 |
| example 5 | −640 | 1.7 | 3.0 |
| example 6 | −640 | 1.9 | 2.9 |
| example 7 | −650 | 2.1 | 2.2 |
| example 8 | −640 | 2.3 | 2.8 |

TABLE 1-continued

| | Vo (V) | E½ (lux · sec) | DDR₁ (%) |
|---|---|---|---|
| example 9 | +630 | 1.6 | 12.0 |
| example 10 | +620 | 1.9 | 13.0 |
| example 11 | +620 | 1.5 | 12.7 |
| example 12 | +630 | 1.7 | 12.2 |
| comparative example 1 | +620 | 36.0 | 6.5 |
| comparative example 2 | +600 | 5.7 | 14.0 |
| comparative example 3 | +610 | 8.3 | 13.0 |
| comparative example 4 | +600 | 3.2 | 14.3 |
| comparative example 5 | +620 | 15.0 | 12.0 |
| comparative example 6 | +610 | 12.8 | 10.8 |
| comparative example 7 | +600 | 6.5 | 13.7 |

EXAMPLE 13-16

Photosensitive members were prepared with the same structure and in a similar way as Example 1 except that the styryl compound (33), (34), (38), (39) for the charge transporting layer were used respectively instead of the styryl compound (3). The photosensitive members thus obtained were tested in the same manner in Example 1 to measure Vo, $E_{1/2}$ and $DDR_1$.

EXAMPLES 17-20

Photosensitive members were prepared with the same structure and a similar way as Example 5 except that the styryl compound (45), (49) (51) and (53) for the charge transporting layer were used respectively instead of the styryl compound (4). The photosensitive members thus obtained were tested in the same manner in Examples 5 to measure Vo, $E_{1/2}$ and $DDR_1$.

EXAMPLES 21-24

Photosensitive members were prepared with the same structure and in a similar way as Example 9 except that the styryl compound (33), (39), (51), (54) for the charge transporting layer were used respectively instead of the styryl compound (21). The photosensitive members thus obtained were tested in the same manner in Example 9 to measure Vo, $E_{1/2}$ and $DDR_1$.

COMPARATIVE EXAMPLE 8

Photosensitive member was prepared with the same structure and in a similar way as Example 21 except that the styryl compound below;

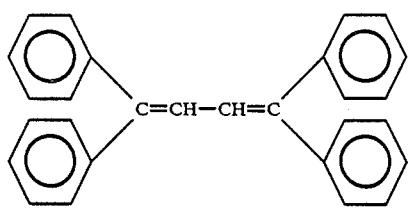

for the charge transporting layer was used instead of the styryl compound (33). The photosensitive members thus obtained was tested in the same manner in Example 21 to measure Vo, $E_{1/2}$ and $DDR_1$.

COMPARATIVE EXAMPLE 9

Photosensitive member was prepared with the same structure and in a similar way as Example 21 except that the styryl compound below;

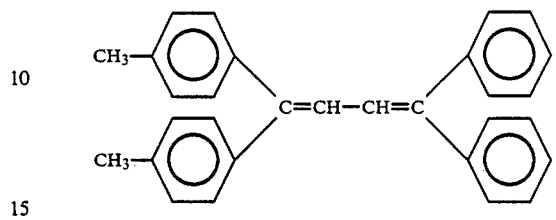

for the charge transporting layer was used instead o( the styryl compound (33). The photosensitive members thus obtained was tested in the same manner in Example 21 to measure Vo, $E_{1/2}$ and $DDR_1$.

COMPARATIVE EXAMPLE 10

Photosensitive member was prepared with the same structure and in a similar way as Example 21 except that the styryl compound below;

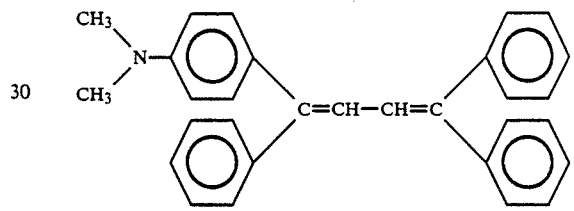

for the charge transporting layer was used instead of the styryl compound (33). The photosensitive members thus obtained was tested in the same manner in Example 21 to measure Vo, $E_{1/2}$ and $DDR_1$. Table 2 shows the results.

TABLE 2

| | Vo (V) | E½ (lux · sec) | DDR₁ (%) |
|---|---|---|---|
| example 13 | −650 | 2.5 | 3.0 |
| example 14 | −640 | 2.6 | 3.5 |
| example 15 | −650 | 2.7 | 2.8 |
| example 16 | −640 | 2.4 | 3.2 |
| example 17 | −640 | 2.0 | 3.5 |
| example 18 | −650 | 2.7 | 2.8 |
| example 19 | −640 | 2.2 | 3.0 |
| example 20 | −650 | 2.5 | 3.0 |
| example 21 | +620 | 2.2 | 13.5 |
| example 22 | +620 | 2.0 | 12.0 |
| example 23 | +610 | 2.2 | 14.0 |
| example 24 | +630 | 2.4 | 11.7 |
| comparative example 8 | +640 | 38.5 | 7.0 |
| comparative example 9 | +630 | 13.7 | 9.5 |
| comparative example 10 | +620 | 8.4 | 11.0 |

EXAMPLES 25-28

Photosensitive members were prepared with the same structure and in a similar was as Example 1 except that the styryl compound (62), (63), (64) and (66) for the charge transporting layer were used respectively instead of the styryl compound (3) and the bisazo compound represented by the formula (B) was used as the charge generating materials instead of the bisazo compound (A). The photosensitive members thus obtained were tested in the same manner in Example 1 to measure Vo, $E_{1/2}$ and $DDR_1$.

EXAMPLES 29-32

Photosensitive members were prepared with the same structure and in a similar way as Example 5 except that the styryl compound (70), (71), (77) and (81) for the charge transporting layer were used respectively instead of the styryl compound (4) and the bisazo compound represented by the formula;

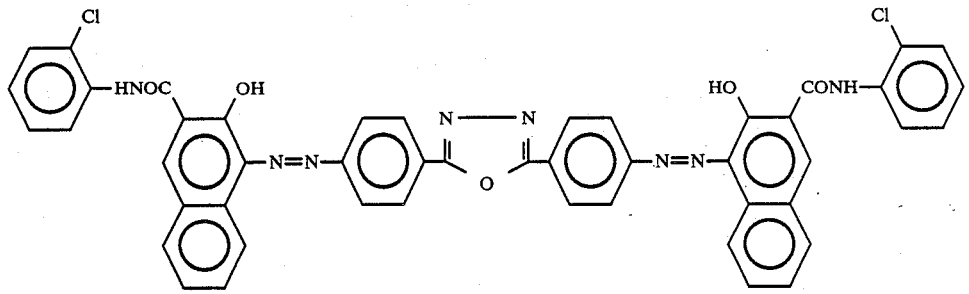

was used as the charge generating material instead of the bisazo compound (B). The photosensitive members thus obtained were tested in the same manner in Example 1 to measure Vo, $E_{1/2}$ and $DDR_1$.

EXAMPLES 33-36

Photosensitive members were prepared with the same structure and in a similar way as Example 9 except that the styryl compound (81), (82), (87) and (88) for the charge transporting layer were used respectively instead of the styryl compound (21). The photosensitive members thus obtained were tested in the same manner in Example 9 to measure Vo, $E_{1/2}$ and $DDR_1$. Table 3 show the results.

TABLE 3

|  | Vo (V) | $E_{\frac{1}{2}}$ (lux · sec) | $DDR_1$ (%) |
|---|---|---|---|
| example 25 | −650 | 2.2 | 2.8 |
| example 26 | −640 | 1.9 | 3.3 |
| example 27 | −640 | 2.0 | 3.0 |
| example 28 | −650 | 2.2 | 2.5 |
| example 29 | −640 | 2.6 | 3.2 |
| example 30 | −650 | 2.8 | 2.8 |
| example 31 | −640 | 2.8 | 3.0 |
| example 32 | −630 | 2.4 | 3.7 |
| example 33 | +620 | 2.0 | 13.0 |
| example 34 | +610 | 2.5 | 14.0 |
| example 35 | +630 | 2.3 | 12.5 |
| example 36 | +610 | 1.9 | 13.8 |

Tables 14–Table 3 show that a photosensitive member of the invention is excellent in sensitivity and charge retaining ability and small dark decay efficiency.

Further, the photosensitive members obtained in Examples 9, 21 and 33 were installed in a commercial electrophtographic copying machine (EP-350Z, made by MINOLTA CAMERA Co., LTD) and provided to actual developments.

The photosensitive members of the invention were found to exhibit excellent gradient of images at first and final stages, no sensitivity variation, clear images and stable repeating properties, even after 1000 times of developments.

[31] 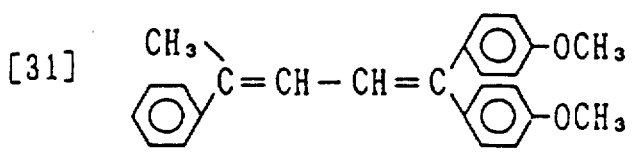
[32] 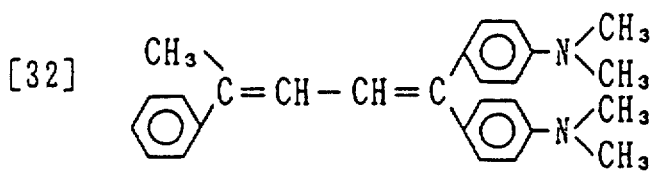
[33] 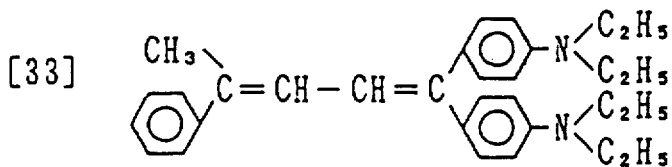
[34] 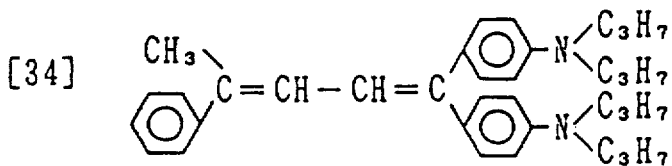
[35] 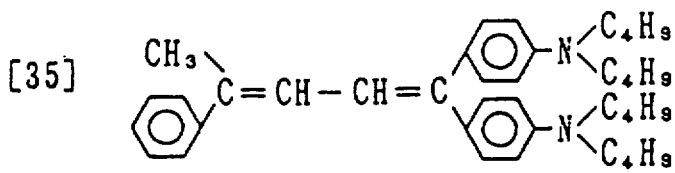
[36] 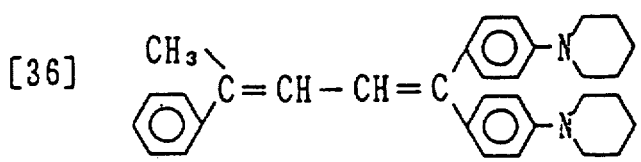

[37] 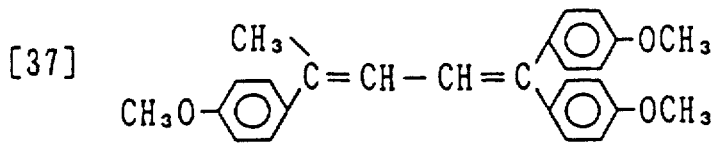
[38] 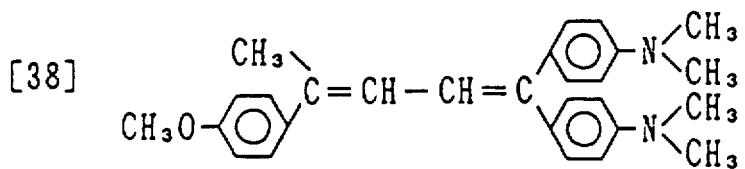
[39] 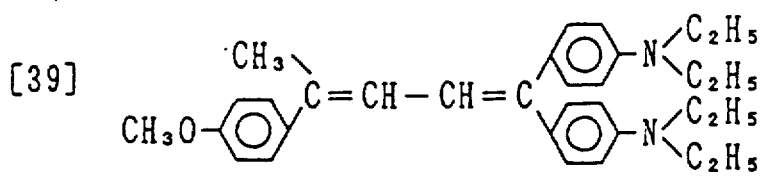
[40] 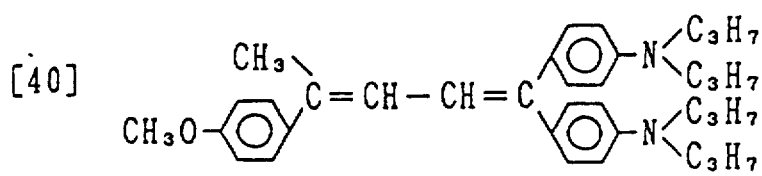
[41] 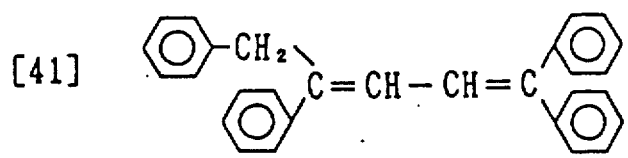
[42] 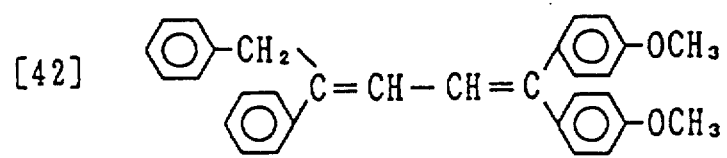

[43] 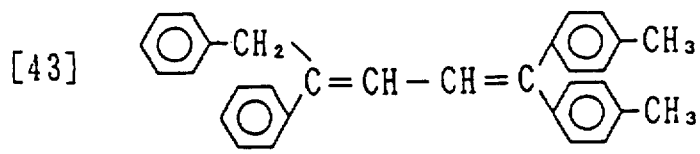
[44] 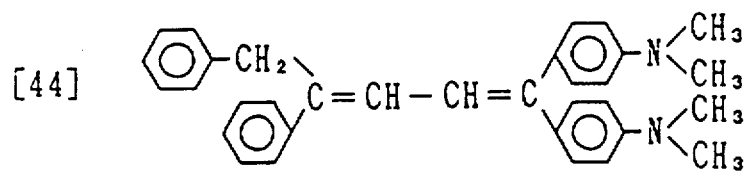
[45] 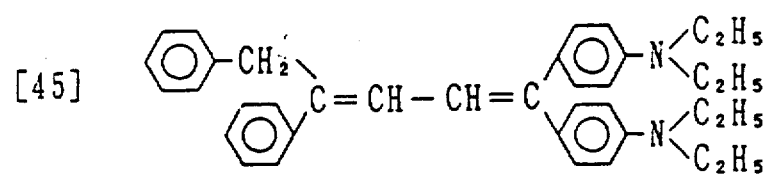
[46] 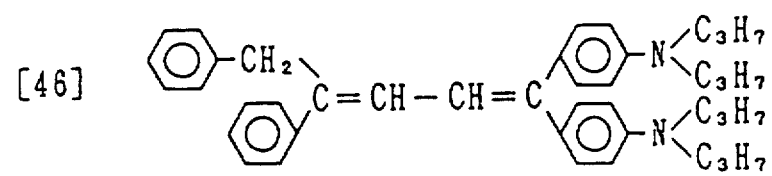
[47] 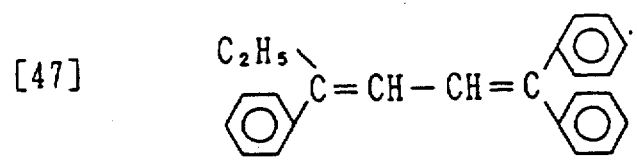
[48] 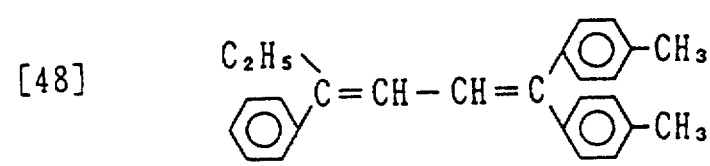

[49] 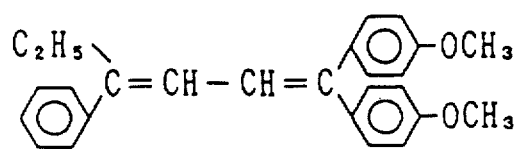
[50] 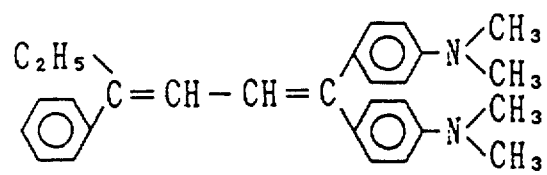
[51] 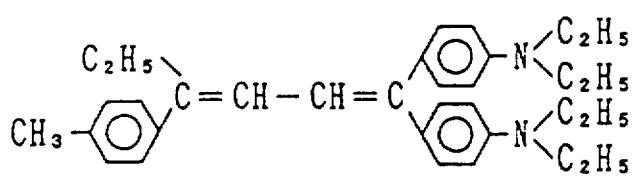
[52] 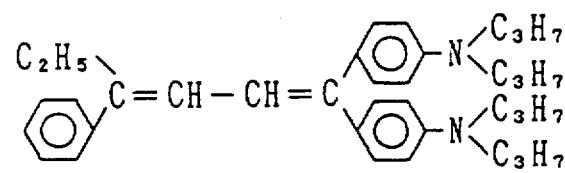
[53] 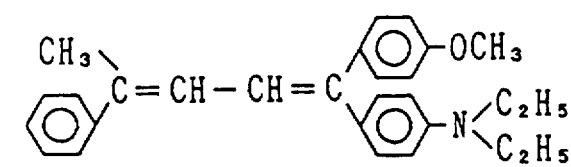
[54] 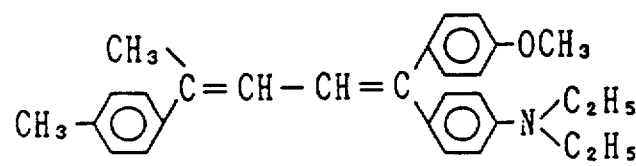

[55] 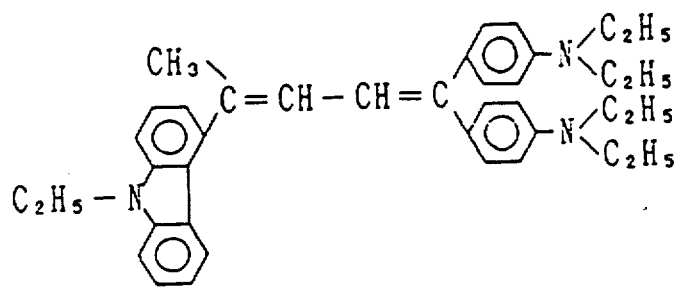
[56] 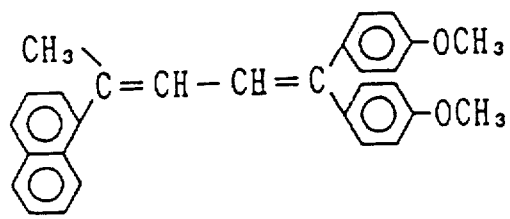
[57] 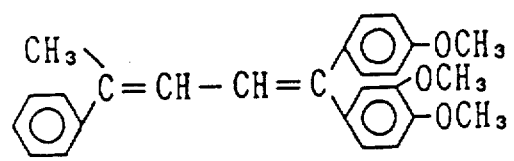
[58] 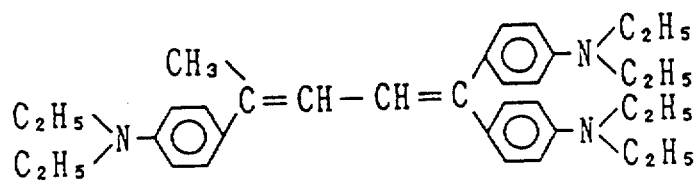
[59] 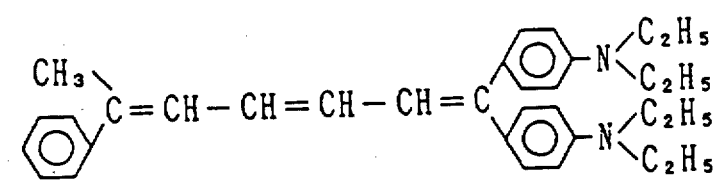
[60] 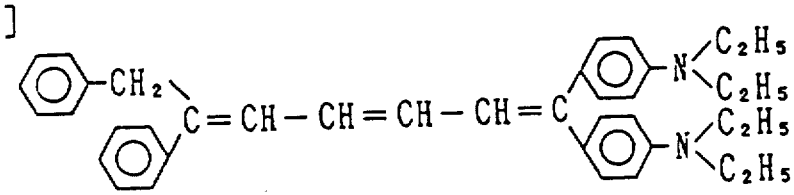

[61] 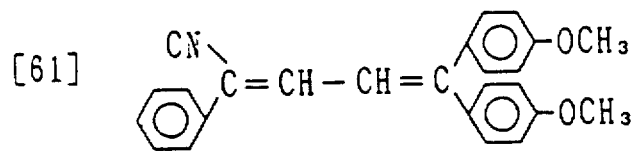
[62] 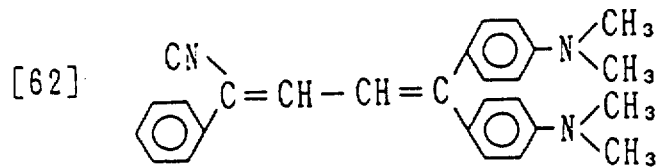
[63] 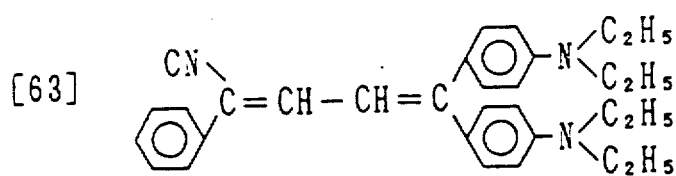
[64] 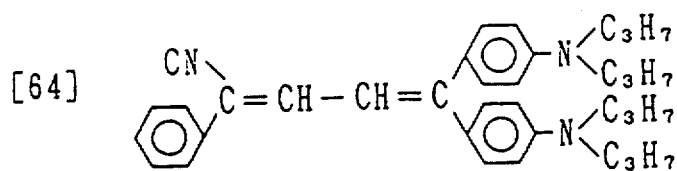
[65] 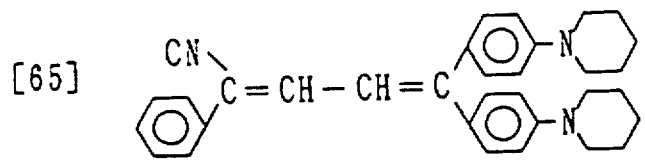
[66] 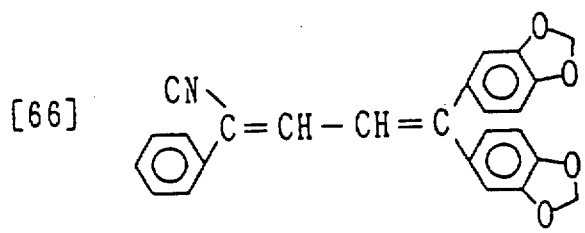

[67] 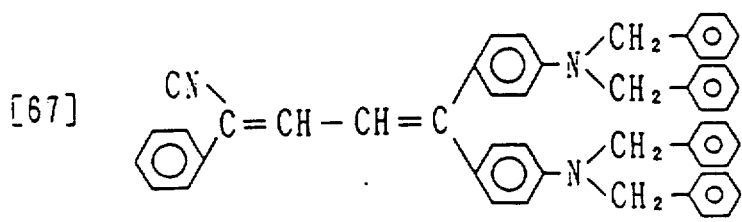
[68] 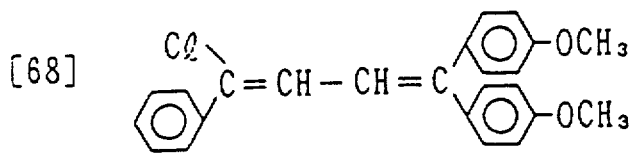
[69] 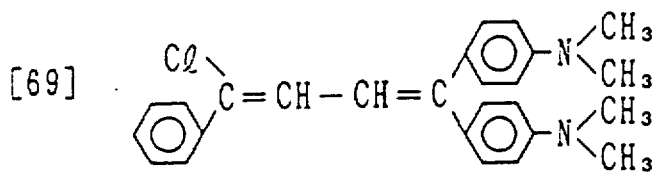
[70] 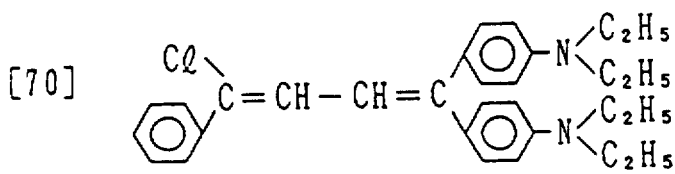
[71] 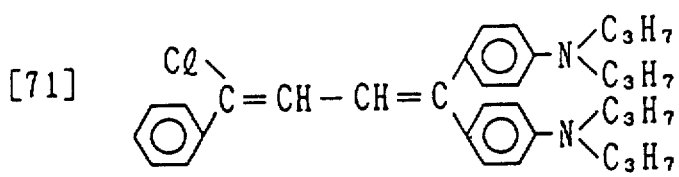
[72] 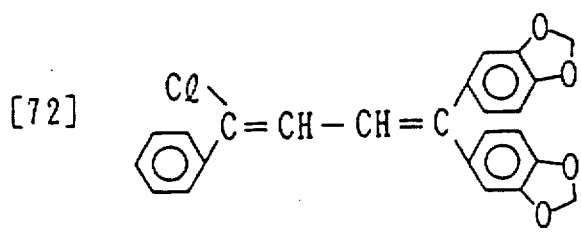

[73] 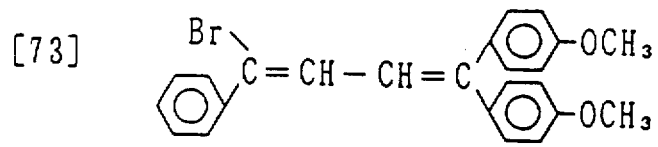
[74] 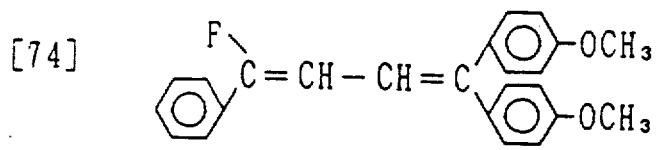
[75] 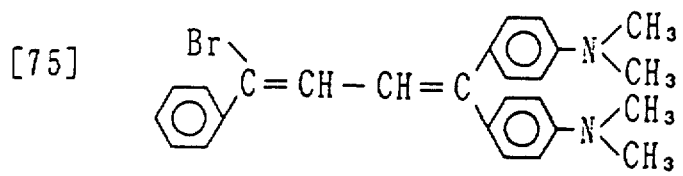
[76] 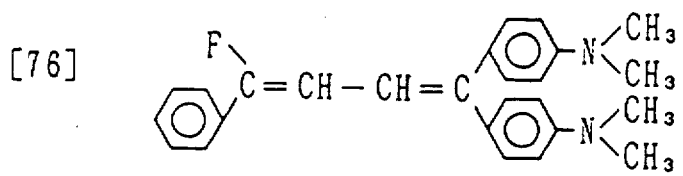
[77] 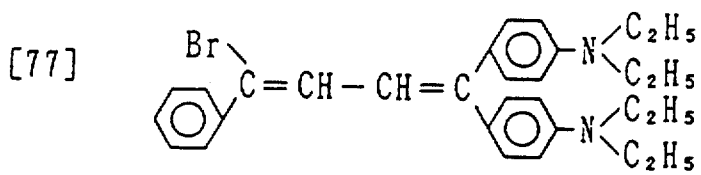
[78] 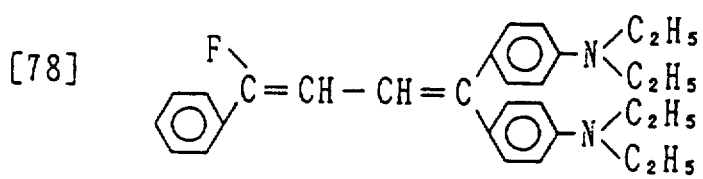

[79] 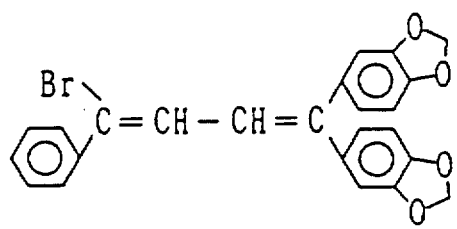
[80] 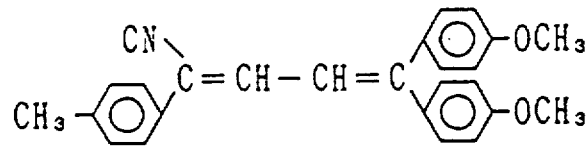
[81] 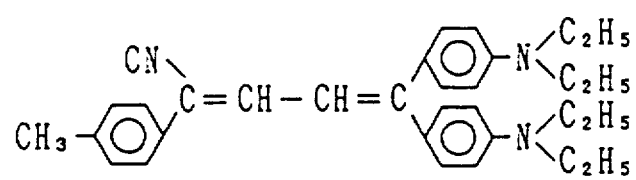
[82] 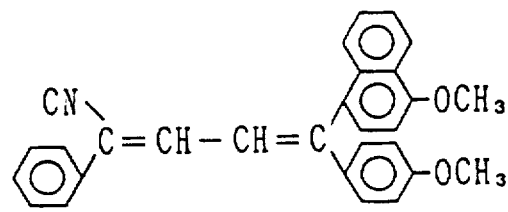
[83] 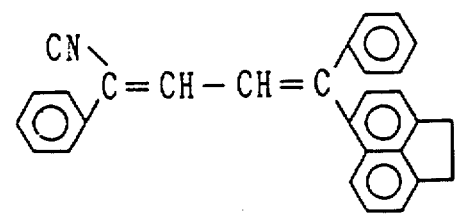
[84] 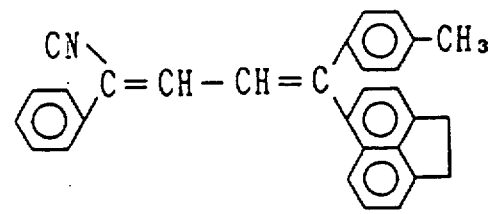

[85] 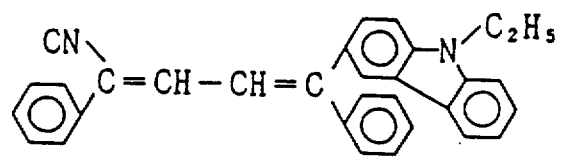
[86] 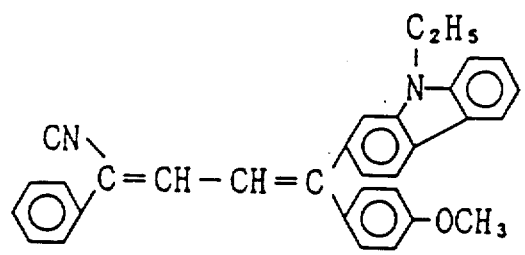
[87] 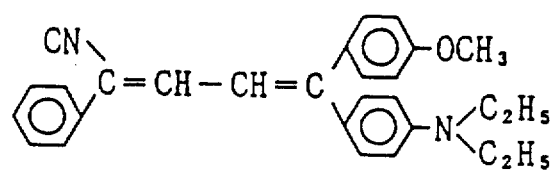
[88] 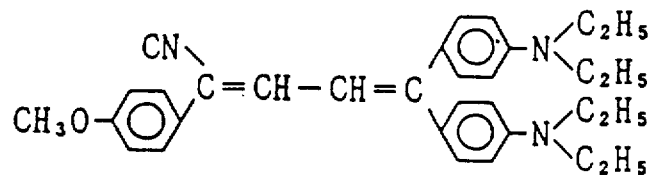
[89] 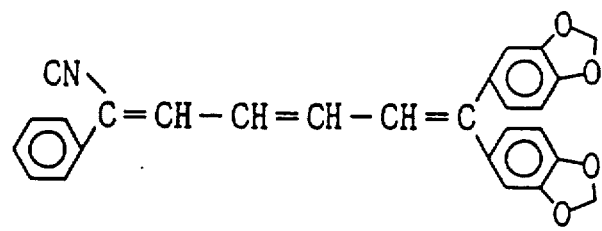
[90] 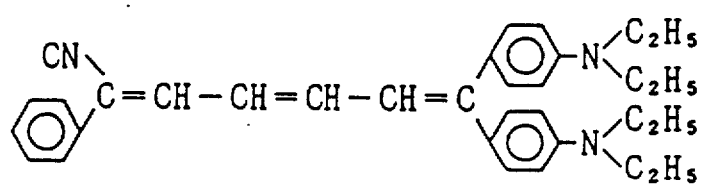

What is claimed is:

1. A photosensitive member comprising a styryl compound as a charge transporting material which is represented by the following formula (I),

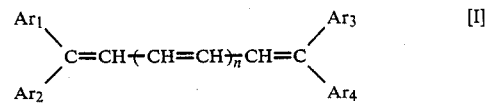

wherein $Ar_1$ is a halogen atom or a cyano group; or a condense polycyclic group, an aromatic heterocyclic group, an alkyl group or an alkyl group, each of which may have substituents; $Ar_2$ is an aromatic hydrocarbon group, a condensed polycyclic group or an aromatic heterocyclic group, each of which may have substituents; $Ar_3$ and $Ar_4$ are independently an aromatic hydrocarbon group, a condensed polycyclic group, or a heterocyclic group, each of which may have substituents; n is 0 or 1; One of $Ar_1$, $Ar_2$, $Ar_3$ and $Ar_4$ is an aromatic hydrocarbon group which may have substituents.

2. A photosensitive member of the function divided type having a charge generating layer and a charge transporting layer which are formed on an electrically conductive substrate, wherein the charge transporting layer comprises a styryl compound represented by the formula (I) of claim 1.

3. A photosensitive member of the dispersion type having a photoconductive layer formed on an electrically conductive substrate, wherein the photoconductive layer comprises a styryl compound represented by the formula (I) of claim 1.

4. A photosensitive member of claim 2, in which the charge generating layer comprises azo pigments.

5. A photosensitive member of claim 2, in which the charge generating layer comprises phthalocyanine pigments.

6. A photosensitive member of claim 2, in which the charge transporting layer is formed on the charge generating layer.

7. A phtosensitive member of claim 2, in which the charge transporting layer has 3–30 μm in thickness.

8. A photosensitive member of claim 2 or claim 3, in which an intermediate layer is formed on the electrically conductive substrate.

9. A phtosensitive member of claim 2 or claim 3, which has a surface protective layer.

10. A photosensitive member of claim 3, in which the photoconductive layer comprises phthalcyanine pigments.

* * * * *

UNITED STATES PATENT AND TRADEMARK OFFICE
CERTIFICATE OF CORRECTION

PATENT NO. : 4,900,645

DATED : Feb. 13, 1990

INVENTOR(S) : Hideaki Ueda

It is certified that error appears in the above-identified patent and that said Letters Patent is hereby corrected as shown below:

Insert the attached formula [31] - [90] at column 13, line 33.

Column 26, line 29, "an alkyl group or an alkyl group" should be -- an alkyl group or an aralkyl group--.

Signed and Sealed this

Third Day of September, 1991

*Attest:*

HARRY F. MANBECK, JR.

*Attesting Officer*  Commissioner of Patents and Trademarks